United States Patent [19]

Winget

[11] 4,275,358
[45] Jun. 23, 1981

[54] FREQUENCY SENSITIVE AMPLITUDE EQUALIZATION CIRCUIT

[75] Inventor: Wayne A. Winget, Richardson, Tex.

[73] Assignee: Rockwell International Corporation, Dallas, Tex.

[21] Appl. No.: 53,478

[22] Filed: Jun. 29, 1979

[51] Int. Cl.³ .............................................. H03F 1/34
[52] U.S. Cl. .................................... 330/109; 330/294; 330/304
[58] Field of Search ............... 330/107, 109, 294, 304; 333/28 R, 28 T; 179/1 D

[56] References Cited

U.S. PATENT DOCUMENTS

| 3,646,464 | 2/1972 | Boggs | 330/107 X |
| 3,835,411 | 9/1974 | Carleson | 330/304 |
| 3,950,711 | 4/1976 | Ohkawa | 330/109 X |

OTHER PUBLICATIONS

Landee et al., *Electronic Designer's Handbook*, McGraw-Hill, 1957, pp. 17-4 to 17-15.
Bode, "Variable Equalizers", *Bell System Technical Journal*, vol. 17, pp. 229-244; Apr. 1938.
Bohn, *National Semiconductor Audio Handbook*, Copyright 1976, pp. 2-53.

*Primary Examiner*—James B. Mullins
*Attorney, Agent, or Firm*—Richard K. Robinson; Howard R. Greenberg; H. Fredrick Hamann

[57] ABSTRACT

The frequency response of the frequency sensitive amplitude equalization circuit disclosed herein can be adjusted by a single potentiometer to be either flat or give a positive or negative gain at a selected frequency.

13 Claims, 4 Drawing Figures

FREQUENCY SENSITIVE AMPLITUDE EQUALIZATION CIRCUIT

BACKGROUND OF THE INVENTION

This invention relates to amplitude equalization circuits and in particular to amplitude equalization circuits used on transmission lines.

There are several examples of equalization circuits known in the art such as those provided in Landee, Robert W., Davis, Donovan C., and Albrecht, Albert P., *Electronic Designers' Handbook*, McGraw-Hill, 1957, pp. 17-4–17-15, which disclose non variable equalizers that are used only where deviations are known and predictable and are not long-term time variants. An example of variable equalization circuits is disclosed in Bode, H. W., "Variable Equalizers," *Bell System Technical Journal*, Vol. 17, pp. 229–244, April, 1938, which were truly variable equalization circuits with positive and negative equalization. The Bode circuits required inverse networks in at least two branches which must be accurately matched against each other and required at least two inductor/capacitor resonators. Furthermore, at least one branch must not be connected to the reference potential or ground.

Since the advent of modern semiconductor technology many advances have been achieved in the design of equalization circuits such as the octave equalization circuits disclosed to the *National Semiconductor Audio Handbook*, Section 2.17, which are limited to fairly low values of bandwidth ratio.

In U.S. Pat. No. 3,646,464 an adjustable active delay amplitude circuit including operational amplifier and resistive and reactive circuit elements in which the adjustment for amplitude can be made substantially independent of an adjustment for delay was disclosed. This circuit required that a differential amplifier must be used and that the inductor cannot be connected to ground. The circuitry had associated with it a zero to 180° phase shift, and restrictions on the slops of the curve that is to be equalized.

The frequency response of the frequency sensitive amplitude equalization circuit disclosed herein can be adjusted by a single potentiometer to be either flat or give a positive or negative gain at a selected frequency.

The disclosed circuit uses only one grounded inductor which can be realized by an inductor or a variety of simple active circuits whose response represents that of a physical inductor. The magnitude and shape of the resulting frequency response is determined by series resistive elements and the ratio of the inductance to capacitance. The bandwidth of the disclosed circuit is limited only by the quality of the inductor, or active circuit with the response of an inductor, used. In addition the circuit requires only an inverting amplifier which provides in combination with the other elements a minimized relative phase shift in the order of 180° plus or minus 90°. There are no restrictions placed on the shape of the curve to be equalized. In fact, a very complex shape which varies only in magnitude can be equalized with one control element. Several equalization circuits may be ganged together to provide either a positive or negative gain bump over a wide band of frequencies and in one circuit disclosed herein it has been used to provide a linear response over a wide band of frequencies.

Many advantages of the present invention may be ascertained from a reading of the specification and the claims in conjunction with the drawings.

DESCRIPTION OF THE INVENTION

Figure 1:
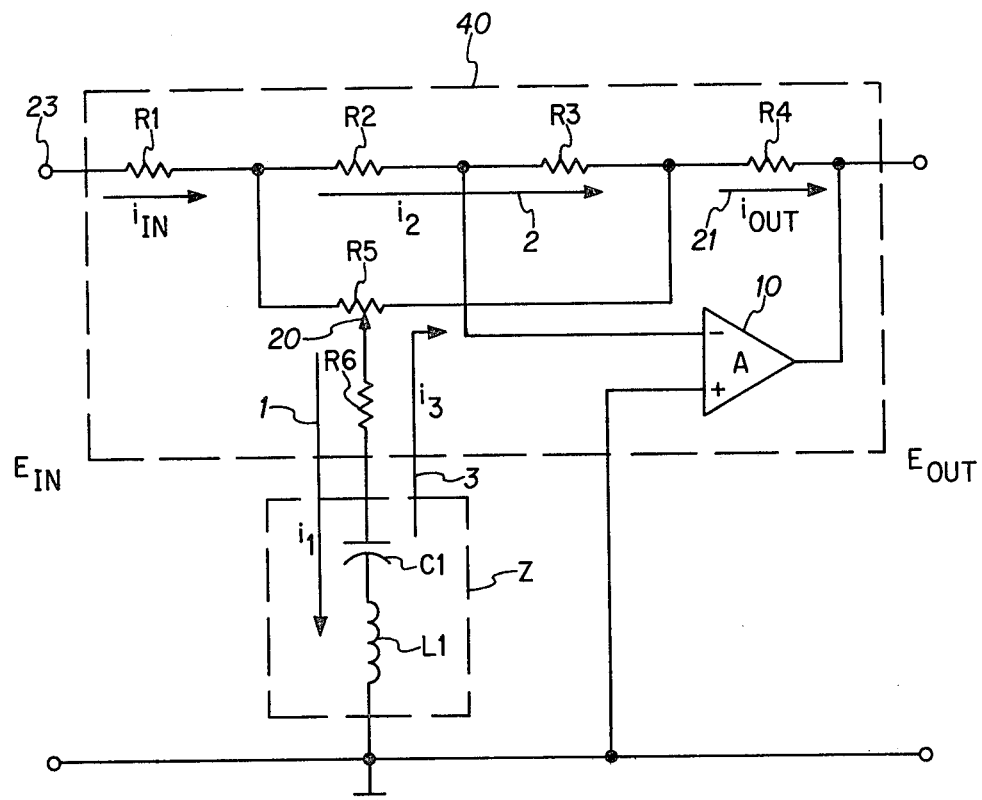
FIG. 1 is a frequency sensitive amplitude equalization circuit according to the teachings of the invention.

Referring to FIG. 1, there is an operational amplifier 10 which has a very large gain, A, and a high input impedance when compared to the resistors R2 and R3. A signal $E_{in}$ is applied to the input resistor R1 and to the inverting input of the amplifier 10 through resistor R2. If R5, a variable resistor or potentiometer, is set at $x=0.5$ where $x \leq 1$ and identifies the position of the wiper arm 20 then in the preferred embodiment where the resistors R1, R2, R3 and R4 are equal, the current through resistor R3 and the impedance Z which includes the inductor L1 and capacitor C1 branch is algebraically summed to 0 since the input signal current $i_{in}$ and the output signal current $i_{out}$ that is represented by arrow 21 are equal but opposite in phase. Therefore, the frequency response is flat for all frequencies that are applied to the input terminal 23. As the value of x varies from 0 to 0.5, the net voltage across the branch that includes resistor R6 and impedance Z is a result of the difference between input and output currents. Therefore, for frequencies at or near the resonance of the inductor L1 and capacitor C1, a shunt impedance appears across the input to the amplifier 10. This results in a dip in the frequency response located at the resonant frequency with the magnitude of the dip determined by the resistance of resistor R6. The circuit Q is the ratio of the frequency of the resonance of inductor L1 and capacitor C1 divided by the bandwidth at one-half the maximum gain or attenuation. As the multiplier x of the resistor R5 varies from 0.5 to 1, then the impedance Z appears as a shunt impedance in the feedback path that includes resistor R3 and R4 and reduces the feedback current flowing into the inverting input of the amplifier 10. In this arrangement the gain of the overall circuit is increased at the resonant frequency of the inductor L1 and the capacitor C1. The magnitude and the shape of the resonant frequency response is determined by the magnitude of resistor R3, the position of the wiper arm 20 and the ratio of the inductor L1 to capacitor C1.

In classical feedback analysis the voltage appearing at the inverting input of amplifier 10 is essentially zero. The same current $i_2$ flows in R2 and R3 since the amplifier impedance is high when compared to R2 and R3. Thus the loop equation can be written for FIG. 1 as:

$$E_{in} = R1 i_{in} + XR5 i_1 + Z i_1 - Z i_3$$

and $$E_o = R4 i_{out} + (1-X) R3 i_3 + Z i_3 - Z i_3.$$ In the above equation Z of course represents the impedance Z. The transfer function is given by the ratio of $E_o$ over $E_n$ and can be represented by $$\frac{E_{out}}{E_{in}} = \frac{R1\, i_{in} + XR5\, i_1 + Z(i_1 - i_3)}{R4\, i_{out} + (1-X)R5\, i_3 + Z(i_3 - i_1)}.$$

Since the resistances $XR_5$ and $(1-X)R_5$ are in the current paths, $i_1$, represented by line 1, and $i_3$, represented by line 3, are proportional to the resistance of $XR_5$ and $(1-X)R_5$. From the equation it can be seen that the voltage gain is proportional to the product of the difference of currents $i_1$ and $i_3$ and the impedance Z. Since the currents $i_1$ and $i_3$ are proportional to the resistance of $XR_3$ and $(1-X)R_5$ respectively, it is possible to adjust $i_1$ to be equal to $i_3$ in which case the term involving the frequency dependent impedance Z vanishes and the gain of the circuit is controlled for all frequency by the ratio of $$\frac{R1 + XR5}{R4 + (1-X)R_5}.$$

For example, if $(R1+XR5)=3(R4+(1-X)R5)$, then the gain for all frequencies will be equal to 3. In the preferred embodiment the circuit has $R1+XR5$ equal to $R4+(1-X)R5$. Then if XR5 is decreased, the magnitude of $i_1$ will increase relative to $i_3$. This will increase the magnitude of the numerator of the above equation and decrease the magnitude of the denominator since the term involving $i_1$ and $i_3$ is negative in the denominator and positive in the numerator. The magnitude of the gain function is then a function of frequency by virtue of the product of Z and the current difference of $i_1$-$i_3$ and also a function of the ratio of $$\frac{XR_5}{(1-X)R_5} = \frac{X}{1-X}$$

since this ratio determines the current difference. If XR5 is increased then $(1-X)R5$ will decrease and the magnitude of $i_1$ will decrease relative to $i_3$. This decrease changes the sign of the current difference terms in the previous explanation and the result is the inverse of the gain frequency characteristic previously obtained.

The magnitude of R2 and R3 are relatively unimportant so long as they are equal if unity gain is desired for the equalization circuit or of the same ratio as R1 and R4 for the case where the gain of the circuit is greater than 1. They must also be small enough to avoid degrading the offset voltage performance of the operational amplifier 10. A resistor in series with the non inverting input will help balance the offset voltage by its current.

No restrictions need to be placed on the nature of the impedance Z. It can be as simple as a single capacitor or inductor or a complex network of both capacitors and inductors and also including resistors depending upon the shape of the gain frequency irregularities to be equalized.

In the one embodiment of the circuit the impedance Z is a series connection of an inductor L1 and a capacitor C1 and the resistor R6.

Figure 2:
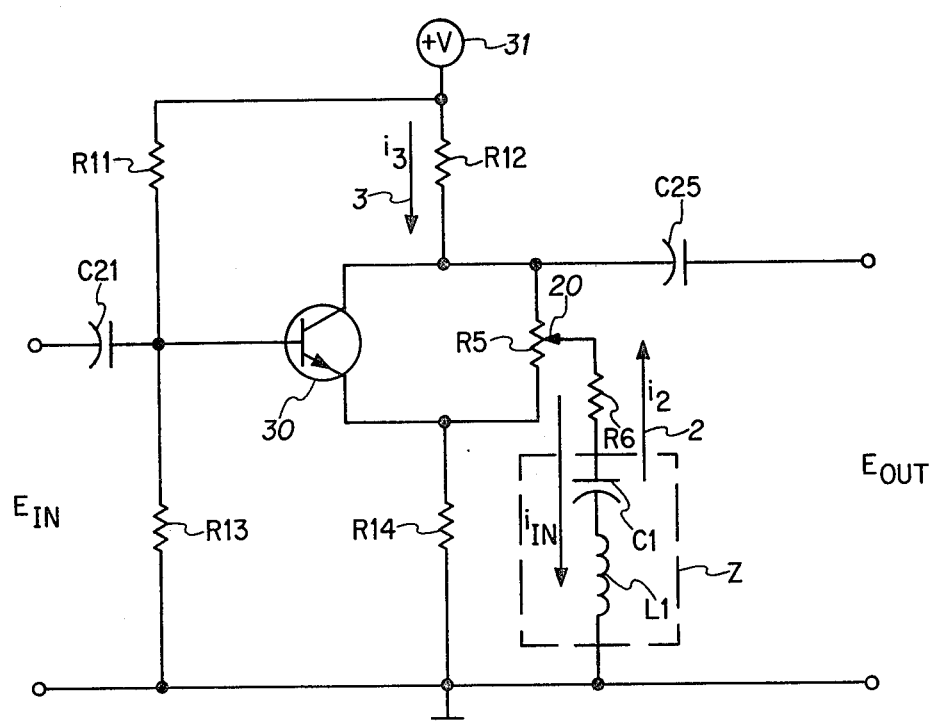
FIG. 2 is another embodiment of the frequency sensitive amplitude equalization circuit according to the teachings of the invention.

FIG. 2 is an equalization circuit that utilizes a transistor as the inverting amplifier. The impedance of R6, C1 and L1 appears as an additional load to the transistor circuit. The input signal is coupled by capacitor C21 to the base of the transistor 30. The reactance of the capacitor C21 must be too small to affect the operation of the equalization circuit shown in FIG. 2. The resistors R11 and R13 are the DC bias resistors and selected to be too large to significantly contribute to the operation of the circuit. The emitter resistor R14 is large enough to allow ignoring the internal emitter resistance $r_e$ of the transistor and the collector resistor R12 is small enough to allow ignoring the equivalent internal collector resistance $r_c$ of the transistor. Utilizing these design parameters, the input signal $E_{in}$ will be conducted to the junction of R14 and XR5 where R5 is again a variable resistor and X is the position of the wiper arm 20. The emitter current of the transistor is made up of two components $E_{in}/R14$ and $i_1$. The value of $i_1$ is a function of the output by reason of the feedback path in the impedance Z. The collector current is for practical purposes in the circuit equal to the current flowing through the emitter and can be treated in the circuit analysis as a current source with the voltage source 31, the collector resistor R12 and the feedback path that includes resistor $(1-X)R5$.

The loop equation for the circuitry of FIG. 2 is $$E_{in} = (XR_5 + Z)i_2 - Zi_2$$

and $$E_o = ((1-X)R_5 + Z)i_2 - i_1 Z$$

and the voltage gain is the ratio of $E_o/E_{in}$ and is equal to one for a unity gain circuit. From the equation for the voltage gain it can be seen that the gain is a function of the product of the difference of the currents $i_2$ and $i_1$ and the impedance Z. The ratio of XR5 and $(1-X)R5$ or the currents $i_1$ and $i_2$ can be made equal which causes the Z term to drop out leaving the gain only as a function of $(1-X)R5$ and XR5. Actually the gain is a function of the ratio of R14 and XR5 in parallel and R12 and $(1-X)R5$ in parallel since $i_2$ and $i_1$ are functions of R12 and R14. This condition then implies that for $i_1=i_3$ then $$\frac{XR_5}{(1-X)R_5} = \frac{X}{1-X} = \frac{R12}{R14}.$$

Since Z is an impedance which is a function of frequency then the gain is also a function of frequency only if $i_1$ does not equal $i_3$. The ratio of $i_1$ to $i_3$ can be adjusted by changing the ratio of $X/(1-X)$, thereof, if $i_1$ is larger than $i_2$ then the numerator of the gain equation provided above has a negative second term and the denominator has a positive second term. The magnitude of these terms are a function of frequency since the impedance Z is a function of frequency. If the ratio $X/(1-X)$ is adjusted to make the second term of the numerator and denominator positive and negative respectively then the gain frequency function is the inverse of what was previously attained. No restrictions need to be made upon the structure of the impedance Z. Again it can be a very complex network of capacitors, resistors and inductors or simply an inductor or capacitor. In the embodiment shown in FIG. 2 the impedance Z consists of a series connection of an inductor, capacitor and resistor. This combination gives a frequency response which has a bump either positive or negative at the resonant frequency of the capacitor and inductor combination. The maximum magnitude of the bump is controlled by the series resistor R6. The potentiometer R5 allows adjustment of the ratio $X/(1-X)$ from 0 to infinity. As the ratio is changed from 0 to infinity, the frequency response bump changes from maximum positive through a flat line to maximum negative. The bandwidth of the bump is controlled by the ratio of the inductor L1 to capacitor C1 with the resonant frequency determined by the elements values.

Figure 3:
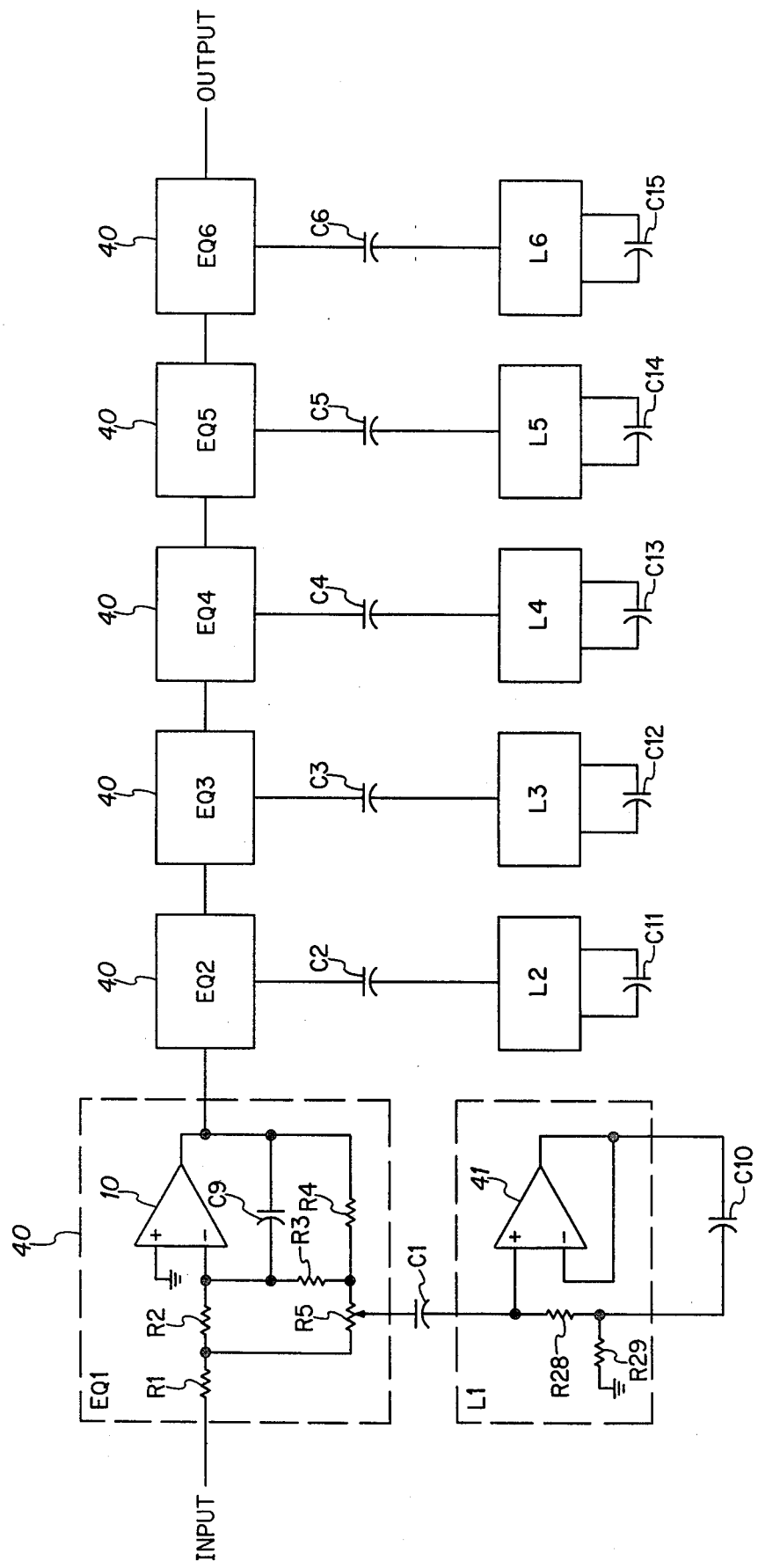
FIG. 3 is six equalization circuits according to the invention in cascade arrangement.

FIG. 3 is a wide band equalization circuit that consists of six sections EQ1 through EQ6 of the basic equalizer circuit 40 of FIG. 1. Each section has unity gain. The resonant frequency of each section is determined by the capacitors C1 through C6 and inductors L1 through L6 respectively and distributed over a desired range with the sections overlapping at a frequency corresponding to one-half of the total amount of equalization desired. In this configuration the complete equalization can be adjusted with minimal interactions between the sections. Capacitor C9 is used for setting the rolloff of the amplifier 10.

In the embodiment shown in FIG. 3, each section has a resistor R5 which consists of a potentiometer and which allows the ratio of $(X/1-X)$ to be varied from 0 to infinity. Each section of the equalization circuit then provides a gain frequency bump whose magnitude can be varied from a maximum positive value to an equal negative value. The maximum value is determined by the value of the series resistance in the impedance network that includes the capacitor Cy and active circuit Ly where y denotes the section that each element is associated with on FIG. 3. The bandwidth is determined by the ratio of inductance to capacitance. Since the impedance network has only one grounded lead the inductor is grounded and is realized by the active circuitry that includes an amplifier 41, resistors R28 and R29, plus a capacitor CZ. Z represents capacitor C10 through C15. The capacitors C10 through C15 are used to select the desired equivalent inductance of the active circuits, whereas capacitors C1 through C6 are used to select the desired resonance for the circuitry.

Figure 4:
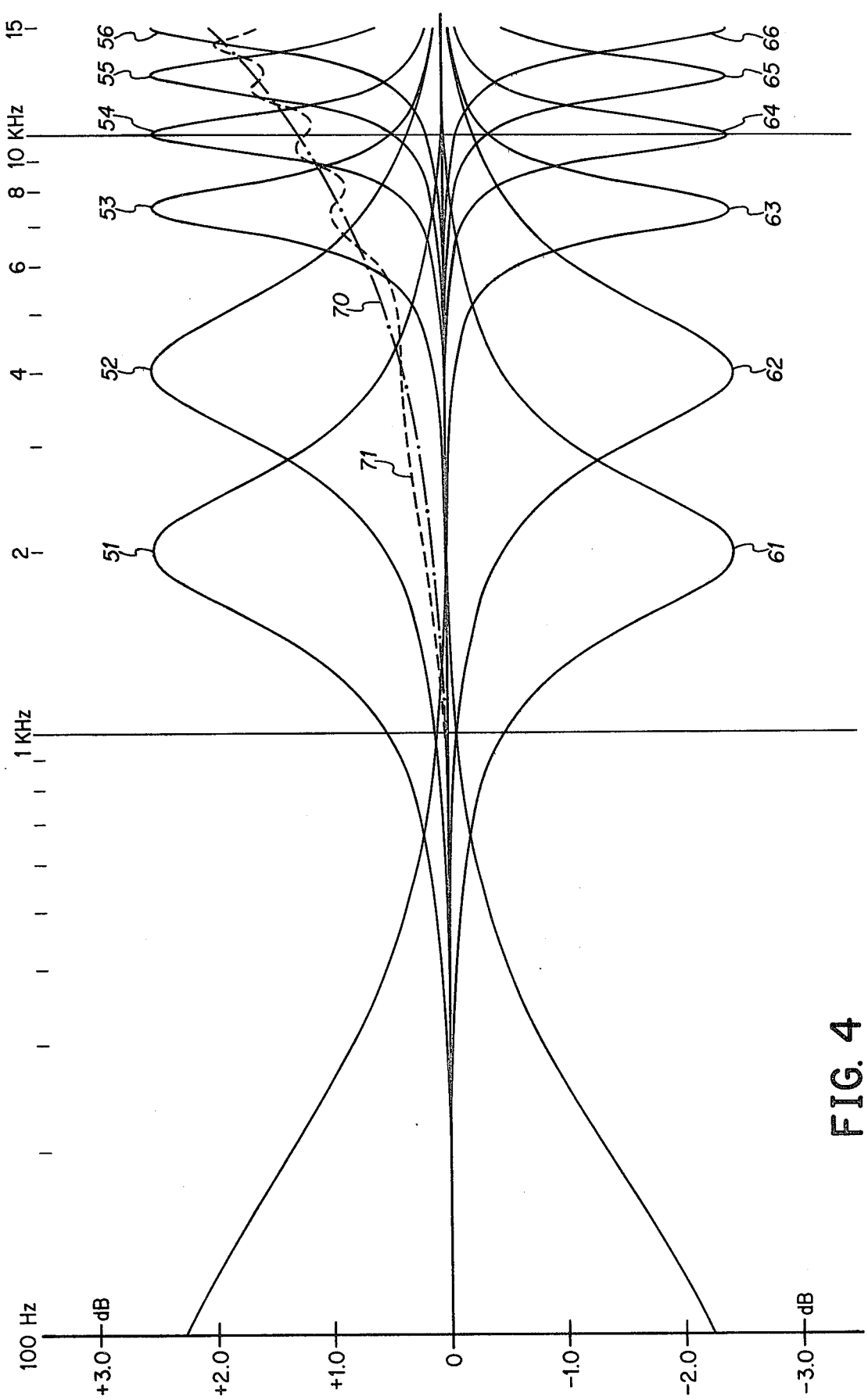
FIG. 4 is the frequency response curves of the cascaded arrangement of FIG. 3.

FIG. 4 is the frequency response curve of the performance of the circuitry of FIG. 3. Curves 51 and 61 are associated with the network that includes EQ1, C1 and L1. Curve 61 demonstrates the frequency response when R5 is adjusted so as to shunt the input signal at the junction of R1 and R2 whereas curve 51 shows the frequency response when R5 is adjusted to provide a shunt for the junction of resistor R3 and R4. Similarly, by selecting the values of capacitors C2 through C6, C11 through C15, and then by varying R5 for each equalizer circuit 40, curves 52 and 62 likewise provide a frequency response for the second equalization section EQ2. Curves 53 and 63 correspond to the third equalization circuit EQ3,C3 and L3 whereas curves 54 and 64 correspond to the fourth equalization circuit EQ4,C4 and L4. Curve 55 and 65 are the frequency response for the fifth equalization circuit EQ5, C5 and L5. Finally, curves 56 and 66 correspond to the final equalization circuit EQ6, C6 and L6 of FIG. 3.

It can be seen from FIG. 4 and the above detailed discussion that the equalization curve can be varied to provide any desired frequency response. This is most useful in the case of a coaxial transmission line where the attenuation of the transmission line is proportional to the square root of the frequency that is being applied to it. It can be shown that the circuitry of FIG. 3 can be designed to increase the gain of the circuitry with frequency, or the square of frequency and thereby compensate the loss that would occur in a coaxial transmission line. An example of the application of the equalization circuits of FIG. 3 can be in the situation where it is desired to have an equalization provided for coaxial transmission line that is transmitting audio range frequencies i.e., from 30 Hz to 15 KHz. It has been determined that the gain of the equalization circuit should vary from approximately a 0 at dB 1 KHz to a gain of 1.9 dB at 15 KHz. The desired or calculated performance of the circuitry of FIG. 3 is shown in FIG. 4 by curve 70. By the appropriate adjustment of resistor R5 for each equalizer circuit 40, it was found that the curve 70 is closely approximated in the actual response of the circuit by curve 71 of FIG. 4. Table 1 provides the component values for each equalizer circuit 40, the active inductors L1 through L6 and the capacitors shown in FIG. 3.

TABLE 1

| R1 | 10K | C1 | 5110 | PF | C10 | .047 μf |
|---|---|---|---|---|---|---|
| R2 | 10K | C2 | 2600 | PF | C14 | .024 μf |
| R3 | 10K | C3 | 680 | PF | C12 | .025 μf |
| R4 | 10K | C4 | 240 | PF | C13 | .037 μf |
| R5 | 20K | C5 | 180 | PF | C14 | .030 μf |
| R28 | 5.1K | C6 | 190 | PF | C13 | .025 μf |
| R29 | 5.1K | C9 | 10 | PF | | |

PF = Picofarads
μF = Micofarads
K = Kilohms

It is understood that various modifications may be made in the circuit or circuits of the present invention without departing from the spirit and scope of the invention itself as limited by the appended claims.

What is claimed is:

1. A frequency sensitive amplitude equalizing circuit, comprising:
    means for providing an output signal that is a gain factor "A" times an input signal where "A" is a negative value;
    variable means "X" for providing a shunt to a reference point, the input signal of a predetermined frequency if said variable means "X" is <0.5, and the output signal, if the variable means "X" is 0.5, ≦1; and
    means for providing an input resistance in series with the means for providing an output signal and an output resistance in series with the means for providing an output signal including, in cascade arrangement, four resistors of equal resistance, with the junction of the first two resistors connected to the variable means "X," the junction of the second and third resistors connected to the input of the means for providing an output signal, the junction of the third and fourth resistors connected to the variable means "X," and the output means for providing an output signal being connected to the fourth resistor.

2. The frequency sensitive amplitude equalizing circuit, according to claim 1, wherein variable means "X" is a potentiometer connected between the junctions of the first and second resistors and the third and fourth resistors.

3. The frequency sensitive amplitude equalizing circuit, according to claim 1, wherein the variable means "X," comprises:
    an impedance between the means "X" and a reference point wherein the predetermined frequency is the resonance of the frequency of the impedance.

4. The frequency sensitive amplitude equalizing circuit, according to claim 1 wherein the means for providing an output signal comprises an inverting amplifier.

5. A frequency sensitive amplitude equalizing circuit, comprising:
a plurality of, in cascade arrangement,
means for providing an output signal that is a gain factor "A" times an input signal where "A" is a negative value including for each means for providing an output signal;
variable means "X" for providing a shunt to a reference point, the input signal of a predetermined frequency if the variable means "X" is <0.5, and the output signal of a predetermined frequency, if the variable means "X" is >0.5, ≦1 selected; and
means for providing an input resistance in series with the means for providing an output signal and an output resistance, in series with the means for providing an output signal including in cascade arrangement, four resistors of equal resistance, with the junction of the first two resistors connected to the variable means "X," the junction of the second and third resistors connected to the input of the means for providing an output signal, the junction of the third and fourth resistors connected to the variable means "X," and the output of the means for providing an output signal being connected to the fourth resistor.

6. A frequency sensitive amplitude equalizing circuit, comprising:
means for providing an output signal that is a gain factor "A" times an input signal where "A" is a negative value;
means "X" for providing a shunt to a reference point, an input signal of a predetermined frequency, the means "X" is <0.5; and
means for providing an input resistance in series with the means for providing an output signal and an output resistance, in series with the means for providing an output signal including, in cascade arrangement, four resistors of equal resistance with the junction of the first two resistors connected to the means "X," the junction of the second and third resistors connected to the input of the means for providing an output signal, the junction of the third and fourth resistors connected to the means "X," and the output of the means for providing an output signal being connected to the fourth resistor.

7. The frequency sensitive amplitude equalizing circuit, according to claim 6, wherein means "X" is a resistor connected between the junctions of the first and second resistors and the third and fourth resistors.

8. The frequency sensitive amplitude equalizing circuit, according to claim 6, further comprises:
an impedance between the means "X" and a reference point wherein the predetermined frequency is the resonance of the frequency of the impedance.

9. The frequency sensitive amplitude equalizing circuit, according to claim 6, wherein the means for providing an output signal comprises an inverting amplifier.

10. A frequency sensitive amplitude equalizing circuit; comprising:
means for providing an output signal that is a gain factor "A" times an input signal where "A" is a negative value;
means "X" for providing a shunt to a reference point, the output signal of a predetermined frequency, if the variable means "X" is >0.5, ≦1; and
means for providing an input resistance in series with the means for providing an output signal and an output resistance in series with the means for providing an output signal, including, in cascade arrangement, four resistors of equal resistance with the junction of the first two resistors connected to the means "X," the junction of the second and third resistors connected to the input of the means for providing an output signal, the junction of the third and fourth resistors connected to the variable means "X," and the output of the means for providing an output signal connected to the fourth resistor.

11. The frequency sensitive amplitude equalizing circuit, according to claim 10, wherein means "X" is a resistor connected between the junctions of the first and second resistors and the third and fourth resistors.

12. The frequency sensitive amplitude equalizing circuit, according to claim 10, further comprising:
an impedance between the means "X" and a reference point wherein the predetermined frequency is the resonant frequency of the impedance.

13. The frequency sensitive amplitude equalizing circuit, according to claim 10, wherein the means for providing an output signal comprises an inverting amplifier.

* * * * *